J. S. BARGANIER.
COTTON DROPPER ATTACHMENT.
APPLICATION FILED MAY 10, 1911.

1,007,261.

Patented Oct. 31, 1911.

2 SHEETS—SHEET 2.

Witnesses
W. N. Woodson
Juana M. Fallin

Inventor
J. S. Barganier

By H. M. Stacy, Attorneys.

UNITED STATES PATENT OFFICE.

JOE S. BARGANIER, OF FORT DEPOSIT, ALABAMA.

COTTON-DROPPER ATTACHMENT.

1,007,261. Specification of Letters Patent. Patented Oct. 31, 1911.

Application filed May 10, 1911. Serial No. 626,320.

*To all whom it may concern:*

Be it known that I, JOE S. BARGANIER, a citizen of the United States, residing at Fort Deposit, in the county of Lowndes and State of Alabama, have invented certain new and useful Improvements in Cotton-Dropper Attachments, of which the following is a specification.

This invention relates to cotton dropper attachments for planters, and has for its object to provide an attachment of simple structure which may be easily and readily applied to the frame of a planter for the purpose of selecting the cotton seed from the planter in predetermined quantities and passing the same to the furrow in which they are deposited.

With this object in view, the attachment includes a body adapted to be positioned upon the frame of a planter so that its receiving end is over the delivery outlet of the hopper and the planter. Said body is provided with depending arms in which a shaft is journaled, and a disk is mounted upon the shaft and is located between the arms and is provided in its periphery with recesses adapted to receive the cotton seed. Plugs are adjustably mounted in the said recesses and serve as means for regulating the quantity of seed selected. The body is provided at its forward end with an arcuate portion in the form of a hood which extends down over the forward portion of the disk in close proximity to the same and serves as means for holding the seed in the recesses in the disk until the said recesses pass below the lower edge of the said arcuate portion, when they are free to fall in the furrow opened by the planter. Suitable braces are provided for holding the attachment in place.

Figure 1:
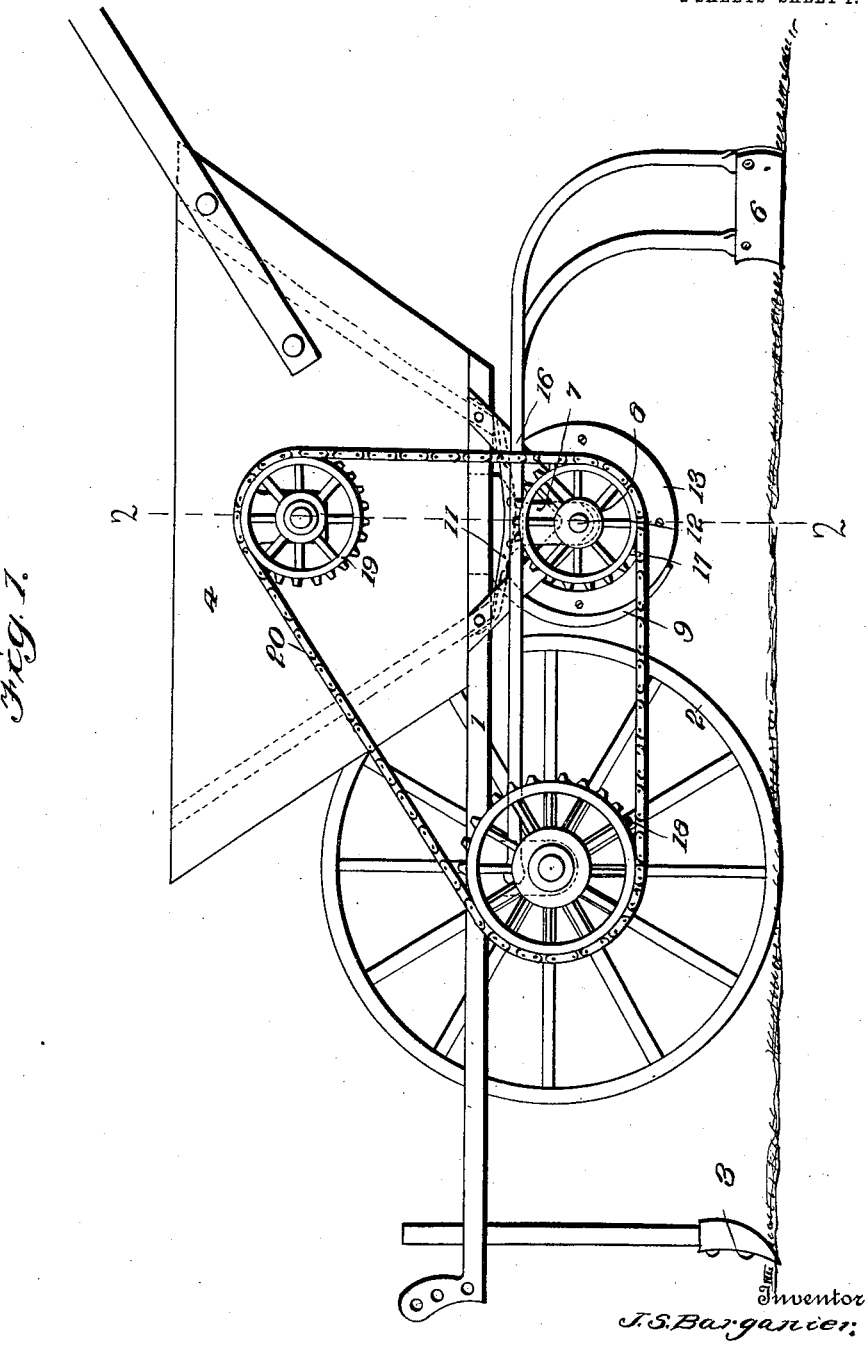
Figure 2:
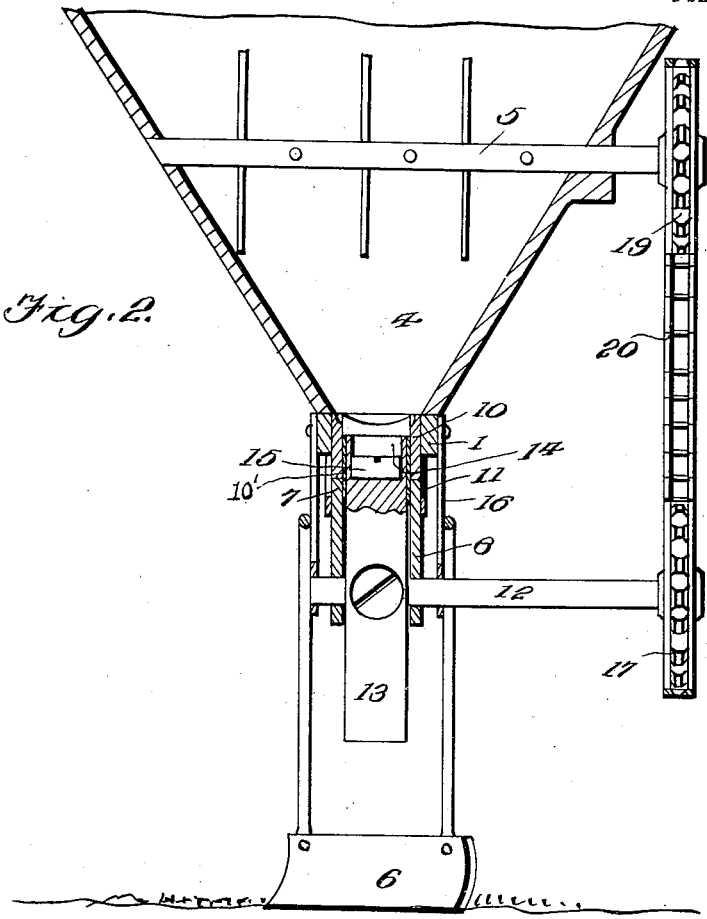
Figure 3:
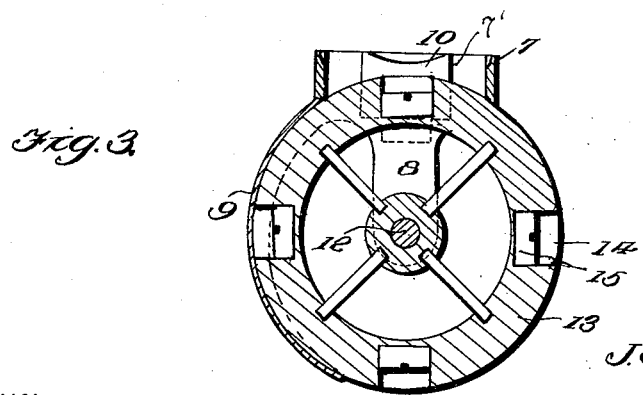

For a full understanding of the invention reference is to be had to the following description and accompanying drawings, in which:

Figure 1 is a side elevation of a planter with the dropper attached; Fig. 2 is a transverse sectional view of the same cut on the line 2—2 of Fig. 1; Fig. 3 is a sectional elevation of the dropper attachment.

Corresponding and like parts are referred to in the following description and indicated in all the views of the accompanying drawings by the same reference characters.

The planter to which the attachment is adapted to be applied is of the usual form and consists of a frame 1 mounted upon a supporting wheel 2, and having at its forward end a furrow opener 3 behind which the wheel 2 is arranged to track. A hopper 4 is mounted upon the frame 1 and is provided with a seed stirrer 5 of any desired pattern. A covering board 6 or other suitable furrow closure is carried at the rear of the frame 1.

The attachment consists of a body 7 having in its sides recesses 7' and provided with spaced depending arms 8 and provided at its forward end with an arcuate portion 9 the lower end of which terminates in close proximity to a vertical plane passing through the long dimensions of the arms 8. That is to say, the lower end of the arcuate portion 9 is not directly under the lower ends of the said arms 8. The detachable sections 10 fit snugly in the recesses 7' in the sides of the body 7 and are provided upon their inner faces with plates 10' which fit between the inner surfaces of the sides of the body 7 and the adjacent sides of a disk 13 to be described later. Braces 11 are attached to the sides of the body and also to the sides of the hopper 4. A shaft 12 is journaled in the lower portions of the arms 8 and carries a disk 13 which is located between the said arms and which is provided in its periphery with recesses 14. Plugs 15 are adjustably mounted in the said recesses and when shifted therein regulate the seed carrying capacity of the recesses. Braces 16 are attached at their ends to the sides of the hopper 4 and at intermediate points are provided with bearings which receive the shaft 12. A sprocket wheel 17 is fixed to the shaft 12, a sprocket wheel 18 is fixed to the axle of the wheel 2, and a sprocket wheel 19 is fixed to the shaft of the stirrer 5 and is located exteriorly of the hopper 4. A sprocket chain 20 is trained about the sprocket wheels 17, 18 and 19.

From the above description it will be seen that as the planter moves across the field, the opener 3 will open the furrow in which the wheel 2 will travel. As the wheel 2 rotates radial movement is transmitted from the sprocket wheel 18 through the chain 20 to the sprocket wheels 17 and 19, which in turn will rotate their attached shafts and thus the stirrer is operated in the hopper and the disk 13 is rotated under the outlet opening of the hopper 4. The forward portion of the disk 13 is snugly received by the arcuate portion 9 of the body 7, and as the recesses 14 pass successively under the outlet opening of the hopper 4 they receive seed from the said hopper and carry the same around under the hood 9. When the recesses 14 arrive successively at the lower end of the hood 9 the seed falls from the said recesses into the furrow opened by the opener 3 and are covered by the covering device 6. By such an arrangement the seed may be selected in predetermined quantities and carried under the hood 9 which will serve as means for holding the seed in the recesses of the disk 13 until the said recesses are at the lowermost points of the disk when the seed are free to fall. Thus the seed will not have to pass through an extensive space to fall from the dropper to the ground, and consequently will not be influenced by the wind or other elements that might tend to prevent the seed from falling in the furrow opened by the opener 3.

If at any time during the planting operation the cotton seed in the lower portion of the hopper 4 should ball to such an extent as to fail to enter the recesses 14, one or both of the sections 10 may be removed by inserting a sharp instrument between the lower edge of the section and the bottom of the recess 7' in which it is located and forcing the same in an upward direction until the lower edge of the plate 10' is above the bottom of the recess 7'. The lower portion of the plate 10' and the section 10 may then be pulled in an outward direction so that the said section and plate may be slipped down out of the recess 7' and from between the side of the frame 1 and the side of the disk 13. After this is done an instrument may be inserted through the recess 7' and the ball of seed may be broken up so that it will feed into the recesses 14. Thus means is provided for removing a ball of seed without having to remove the entire contents of the hopper 4 to get at the same. Furthermore a simple and an effective means is provided for holding the sections 10 in place and the use of hinges is avoided. To replace a section after it has been removed the operation just above described is reversed.

Having thus described the invention, what is claimed as new is:

A seed dropper comprising a body, a disk journaled in the body and provided with peripheral recesses, said body having in its side a recess, a detachable section located in said recess, and a plate attached to the inner side of said section and fitting between the inner side of the body and the adjacent side of the disk.

In testimony whereof, I affix my signature in presence of two witnesses.

JOE S. BARGANIER. [L. S.]

Witnesses:
  CARR BUCHANAN,
  J. B. FARREOR.